L. Miller.
Harvester Rake.

Nº 51070        Patented Nov. 21, 1865.

Witnesses.
Jnº D. Patton
N. W. Huber

Inventor.
Lewis Miller.
By atty A. B. Stoughton

UNITED STATES PATENT OFFICE.

LEWIS MILLER, OF AKRON, OHIO.

IMPROVEMENT IN RAKE ATTACHMENTS TO HARVESTERS.

Specification forming part of Letters Patent No. 51,070, dated November 21, 1865.

*To all whom it may concern:*

Be it known that I, LEWIS MILLER, of Akron, in the county of Summit and State of Ohio, have invented certain new and useful Improvements in a Raking Attachment for Harvesting-Machines; and I do hereby declare the following to be a full, clear, and exact description of the same, reference being had to the accompanying drawings, making a part of this specification, in which—

Figure 1:
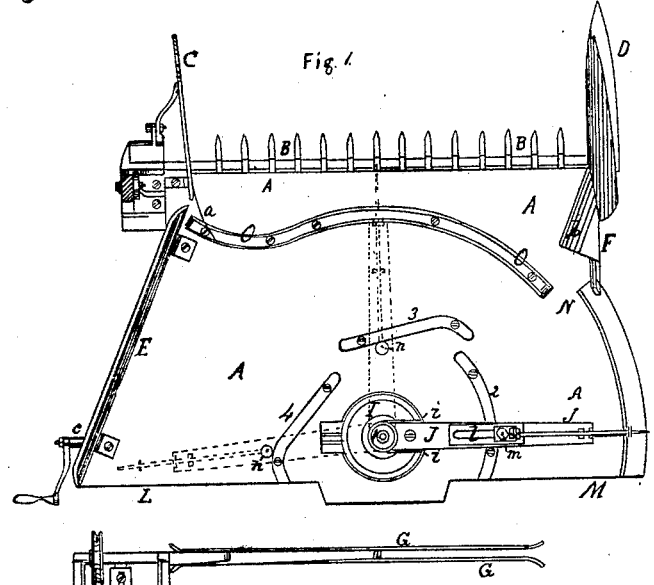
Figure 2:
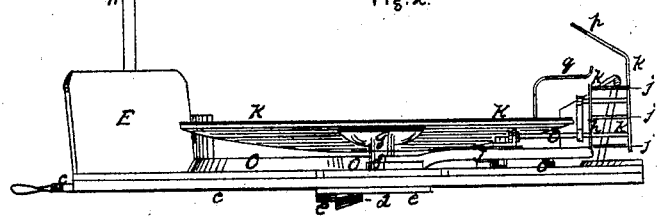
Figure 3:
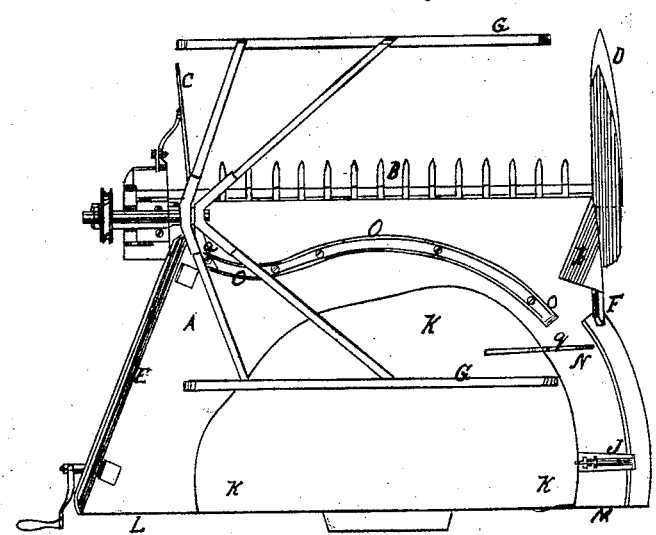

Figure 1 represents a top plan of so much of the platform and cutting apparatus of a harvesting-machine as will illustrate my invention, the table on which the grain falls being omitted to show the working of the rake underneath it. Fig. 2 represents a rear elevation of the platform, grain-table, rake, and other portions of the apparatus. Fig. 3 represents a top plan with the grain-table in place, which conceals the raking mechanism that is underneath it.

Similar letters of reference, where they occur in the separate figures, denote like parts of the machine in all the drawings.

My invention consists in an elevated centrally-supported stationary table for holding up the grain while the rake-arm passes around underneath said table and between it and the platform and takes and sweeps off the grain onto the ground; and it further consists in combining with the elevated table a ledge placed on the platfrom in front of the table, the ledge to hold up the butts of the stalks while the table holds up the heads, so that the rake sweeping between the two may readily take the grain and carry it around to the delivery-point.

It further consists in inclining the elevated table from its rear toward its front, so that while the rake may freely turn underneath it the straws may not pass under the table to choke the rake in its action; and it further consists in leaving two open spaces between the elevated table and the side guide-boards, one for the rake to pass through to gather the gavel and the other to sweep the gavel through to the point of delivery.

To enable others skilled in the art to make and use my invention, I will proceed to describe the same with reference to the drawings.

A represents a platform of any well-known construction; B, the cutting apparatus at the front thereof; C, the inside, and D the outside, dividers; and E the inside, and F the outside, guiding boards or fences, extending rearward from the dividers respectively.

G is a reel arranged on a post, H, both of which may be adjustable.

$a$ $b$ are short wings or shields attached to the inside and outside dividers, respectively, to direct the grain within the reach of the rake.

A shaft, $c$, is placed under the rear portion of the platform A, which may be driven from the main driving power or gear in any of the well-known ways. On this shaft $c$, at about the middle rear portion of the platform, there is a bevel-pinion, $d$, Fig. 2, which gears with and turns a bevel-wheel, I, Fig. 1, to which the rake-arm J is affixed, and by which the rake receives its sweeping motion.

A shield-plate, $e$, underneath the platform, entirely protects the pinion $d$ and gear I, so that no straws or grass can wind in them, and on this shield-plate there is fixed a vertical stud, 1, over which the hub $f$ of the wheel I is placed, said stud forming the support or journal on which said wheel J turns. Upon the top of this stud is set, by means of a suitable metallic socket or other support, $g$, the grain-table K, upon which the heads of the severed grain rest and are supported, and underneath which the rake-arm J turns.

By the use of the permanent stud I attain two desirable objects, first, a support for the gear I, around which it may turn; and, secondly, a support for the grain-table K, upon which it may be held without turning, while there is a free space underneath it for the rake-arm to sweep around in. There is a solid shoe, $i$, cast with or wrought upon the top of the wheel I, in which the rake-arm J is fixed, so that it may turn with said wheel, and on the outer end of the rake-arm there is a vertical post, $h$, with horizontal arms $j$ projecting from it, which act, in conjunction with the sliding clearer $k$, to take, carry around, and deliver the grain as follows: There is a slot, $l$, through the rake-arm, in which a stud, $m$, is placed, the lower end of said stud having a friciion-roll, $n$, upon it which runs against or in contact with the switches 2 3 4, as shown by red dotted lines in Fig. 1, to run the clearer $k$ out and in upon the arms $j$, first to expose said arms and allow them to take the grain, and then at the delivery-point L to push the gavel from the points or rake and allow it to fall upon the ground, and though I speak of the point L as the delivery-point, the rake may work in the other direction, so as to deliver at M, if so preferred. The roll $n$ runs outside of the switch 2, inside of the switch 3, and outside of the switch 4, and thus gets the proper motion to work the clearer, which is connected to said roll by the rod $o$ through a slide, and the stud $m$ before mentioned.

On the clearer $k$ there is an arm, $p$, curved and inclined toward the center of motion of the rake, and upon the grain-table A there is another curved arm, $q$, projecting over the open space N, through which the rake passes to commence clearing the grain-table. The arm $p$ passes over the top of the arm $q$, and thus the two catch and carry forward any straws that may have been thrown in that direction, though the shield $b$ would prevent to a very great extent any grain from falling in that open space or direction.

L, as above mentioned, is the delivery-point, but it may be at M by reversing the action of the rake.

O is a ledge slightly raised above the platform A, and is designed for holding up the butts of the straws while the heads lie upon the table K, and thus leaving an unobstructed space through which the rake-arm may pass underneath the grain, so that the rake will certainly take it and carry it around and deliver it, as above stated.

The table K, as seen in Fig. 3, inclines from its rear toward its front, so that its front edge shall be but little, if any, higher than the ledge O. This is to avoid the grain passing in under it and clogging the rake and its clearer, and to prevent the grain from pushing through the rake itself the clearer $k$ may be covered with canvass or any other light material.

Having thus fully described my invention, what I claim therein is—

1. The stationary centrally-supported elevated table A for holding up the heads of the grain while the rake-arm passes around underneath the table and between it and the platform, substantially as and for the purpose described.

2. In combination with the elevated table for holding up the heads of the grain, the raised ledge on the platform for holding up the butts thereof, so that the rake will with certainty sweep off the grain that bridges the space between them, substantially as described.

3. Inclining the table from its rear toward its front, so that the grain may not pass under to interfere with the free working of the rake, while the rake-arm and its connections can freely turn underneath the table, substantially as described.

4. In combination with the elevated table and platform, the two open spaces between the ends of the table and the sides of the platform for the revolving rake to pass in to take, and to pass out of to deliver, the cut and gathered grain, substantially as described.

L. MILLER.

Witnesses:
 A. B. STOUGHTON,
 EDM. F. BROWN.